United States Patent
Lee et al.

(10) Patent No.: US 11,782,158 B2
(45) Date of Patent: Oct. 10, 2023

(54) MULTI-STAGE OBJECT HEADING ESTIMATION

(71) Applicant: Waymo LLC, Mountain View, CA (US)

(72) Inventors: David Lee, San Carlos, CA (US); Xiaohan Jin, Mountain View, CA (US); Congcong Li, Cupertino, CA (US); Nichola Abdo, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1148 days.

(21) Appl. No.: 16/229,370

(22) Filed: Dec. 21, 2018

(65) Prior Publication Data

US 2020/0200905 A1    Jun. 25, 2020

(51) Int. Cl.
*G01S 17/58* (2006.01)
*G01S 17/06* (2006.01)
(Continued)

(52) U.S. Cl.
CPC .............. *G01S 17/58* (2013.01); *G01S 17/06* (2013.01); *G01S 17/89* (2013.01); *G06N 3/08* (2013.01);
(Continued)

(58) Field of Classification Search
CPC .......... G01S 17/58; G01S 17/06; G01S 17/89; G06N 3/08; G06N 7/005; G06V 10/82;
(Continued)

(56) References Cited

U.S. PATENT DOCUMENTS

| | | |
|---|---|---|
| 5,311,600 A | 5/1994 | Aghajan et al. |
| 5,541,590 A | 7/1996 | Nishio |

(Continued)

FOREIGN PATENT DOCUMENTS

| | | |
|---|---|---|
| CN | 105160356 | 12/2015 |
| CN | 105793730 | 7/2016 |

(Continued)

OTHER PUBLICATIONS

Antony, "Training a neural network in real-time to control a self-driving car," Dec. 10, 2016, retrieved on Aug. 24, 2018, retrieved from URL <https://medium.com/@tantony/training-a-neural-network-in-real-time-to-control-a-self-driving-car-9ee5654978b7>, 6 pages.

(Continued)

*Primary Examiner* — Qian Yang
(74) *Attorney, Agent, or Firm* — Fish & Richardson P.C.

(57) ABSTRACT

Systems, methods, devices, and techniques for generating object-heading estimations. In one example, methods include actions of receiving sensor data representing measurements of an object that was detected within a proximity of a vehicle; processing the sensor data with one or more preliminary heading estimation subsystems to respectively generate one or more preliminary heading estimations for the object; processing two or more inputs with a second heading estimation subsystem to generate a refined heading estimation for the object, the two or more inputs including the one or more preliminary heading estimations for the object; and providing the refined heading estimation for the object to an external processing system.

21 Claims, 5 Drawing Sheets

(51) Int. Cl.
  *G01S 17/89* (2020.01)
  *G06N 3/08* (2023.01)
  *G06V 10/82* (2022.01)
  *G06N 7/01* (2023.01)
  *G06T 7/20* (2017.01)
  *G06V 20/58* (2022.01)
  *B60W 30/095* (2012.01)

(52) U.S. Cl.
  CPC ............... *G06N 7/01* (2023.01); *G06V 10/82* (2022.01); *B60W 30/0956* (2013.01); *G06T 7/20* (2013.01); *G06T 2207/10028* (2013.01); *G06T 2207/30241* (2013.01); *G06T 2207/30252* (2013.01); *G06V 20/58* (2022.01)

(58) Field of Classification Search
  CPC .............. G06V 20/58; B60W 30/0956; B60W 2554/402; B60W 2554/806; B60W 60/001; G06T 7/20; G06T 2207/10028; G06T 2207/30241; G06T 2207/30252
  See application file for complete search history.

(56) References Cited

U.S. PATENT DOCUMENTS

| | | | |
|---|---|---|---|
| 5,640,468 | A | 6/1997 | Hsu |
| 6,208,963 | B1 | 3/2001 | Martinez et al. |
| 6,404,920 | B1 | 6/2002 | Hsu |
| 7,672,920 | B2 | 3/2010 | Ito et al. |
| 8,649,932 | B2 | 2/2014 | Mian et al. |
| 9,015,093 | B1 | 4/2015 | Commons |
| 9,229,102 | B1 | 1/2016 | Wright et al. |
| 9,275,308 | B2 | 3/2016 | Szegedy et al. |
| 9,760,806 | B1 | 9/2017 | Ning et al. |
| 9,989,964 | B2 | 6/2018 | Berntorp et al. |
| 10,013,640 | B1 | 7/2018 | Angelova et al. |
| 10,235,771 | B2 | 3/2019 | Rad |
| 10,331,135 | B2 | 6/2019 | Gao et al. |
| 10,366,502 | B1 | 7/2019 | Li |
| 2003/0233233 | A1 | 12/2003 | Hong |
| 2005/0013486 | A1 | 1/2005 | Wiedemann et al. |
| 2007/0092297 | A1 | 4/2007 | Shimura et al. |
| 2010/0097200 | A1 | 4/2010 | Hilsebecher et al. |
| 2010/0100275 | A1 | 4/2010 | Mian et al. |
| 2010/0169009 | A1 | 7/2010 | Breed et al. |
| 2012/0050021 | A1 | 3/2012 | Rao et al. |
| 2012/0083960 | A1 | 4/2012 | Zhu et al. |
| 2012/0300078 | A1 | 11/2012 | Ogata et al. |
| 2013/0246020 | A1 | 9/2013 | Zeng |
| 2013/0250112 | A1 | 9/2013 | Breed |
| 2013/0332034 | A1 | 12/2013 | Pierce et al. |
| 2014/0210644 | A1 | 7/2014 | Breed |
| 2014/0368493 | A1 | 12/2014 | Rogan et al. |
| 2014/0368807 | A1 | 12/2014 | Rogan |
| 2015/0055821 | A1 | 2/2015 | Fotland |
| 2016/0349362 | A1 | 12/2016 | Rohr et al. |
| 2017/0039436 | A1 | 2/2017 | Chen et al. |
| 2017/0206426 | A1 | 7/2017 | Schrier et al. |
| 2018/0143644 | A1* | 5/2018 | Li ................... B60W 30/18154 |
| 2018/0157963 | A1 | 6/2018 | Salti et al. |
| 2018/0173971 | A1 | 6/2018 | Jia et al. |
| 2018/0348374 | A1 | 12/2018 | Laddha et al. |
| 2019/0188572 | A1 | 6/2019 | Lanctot et al. |

FOREIGN PATENT DOCUMENTS

| | | |
|---|---|---|
| CN | 107024215 | 8/2017 |
| CN | 108089571 | 5/2018 |
| CN | 108431549 | 8/2018 |
| EP | 3324332 | 5/2018 |
| GB | 2541354 | 2/2017 |
| WO | WO 2016189112 | 12/2016 |

OTHER PUBLICATIONS

Bojarski et al., "End-to-End Deep Learning for Self-Driving Cars," Aug. 17, 2016, retrieved on Aug. 24, 2018, retrieved from URL < https://devblogs.nvidia.com/deep-learning-self-driving-cars/>, 16 pages.

Chen et al., "DeepDriving: Learning Affordance for Direct Perception in Autonomous Driving," Proceedings of the IEEE International Conference on Computer Vision, 2015, 2722-2730.

Geiger et al., "Vision meets Robotics: The KITTI Dataset," International Journal of Robotics Research, Aug. 2013, 1231-1237.

Khosroshalu, "Surround Vehicles Trajectory Analysis with Recurrent Neural Networks," 2016 IEEE 19th International Conference on Intelligent Transportation Systems (ITSC), Nov. 2016, 2267-2272.

Li et al., "Vehicle Detection from 3D Lidar Using Fully Convolutional Network," https://arxiv.org/abs/1608.07916, Aug. 2016, 8 pages.

Pomerleau, "Neural Network Vision for Robot Driving," The Handbook of Brain Theory and Neural Networks, 1996, 22 pages.

princeton.edu [online], "Deep Learning for Self-driving Car," retrieved on Dec. 21, 2016, retrieved from URL <http://www.princeton.edu/~alaink/Orf467F14/Deep%20Driving.pdf>, 32 pages.

Rivals et al., "Real-Time Control of an Autonomous Vehicle: A Neural Network Approach to the Path Following Problem," 5th International Conference on Neural Networks and their Applications, 1993, 11 pages.

Santana et al., "Learning a Driving Simulator," arXiv 1608.01230v1, Aug. 2016, 8 pages.

Socher et al., "Convolutional-Recursive Deep Learning for 3D Object Classification," Advances in Neural Information Processing Systems, 2012, 9 pages.

PCT International Search Report and Written Opinion in International Appln. No. PCT/US2019/067240, dated Apr. 1, 2020, 16 pages.

Sung et al., "Robobarista: Learning to Manipulate Novel Objects via Deep Multimodal Embedding," https://arxiv.org/abs/160L02705, Jan. 2016, 20 pages.

PCT International Preliminary Report on Patentability in International Appln. No. PCT/US2019/067240, dated Jul. 1, 2021, 9 pages.

Office Action in Chinese Appln. No. 201980085241.1, dated Jun. 25, 2023, 22 pages (with English translation).

Office Action in European Appln. No. 19842653.8, dated May 24, 2023, 7 pages.

* cited by examiner

MULTI-STAGE OBJECT HEADING ESTIMATION

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions. Autonomous vehicles as used can refer to either fully autonomous vehicles or semi-autonomous vehicles. Fully autonomous vehicles are generally capable of completely automated driving independent of a human operator, while semi-autonomous vehicles automate some driving operations but allow for different levels of human control or intervention.

Autonomous vehicles can include on-board computer systems configured to perform tasks such as analyzing data about the vehicle's environment and determining navigational plans for the vehicle. In some cases, an autonomous vehicle includes sensors configured to detect object around the vehicle and to estimate attributes of the objects. For example, other vehicles, cyclists or pedestrians may be detected, and their locations, headings, and movements determined. The heading of an object generally refers to a direction in a particular coordinate system that the object is facing at a particular time.

SUMMARY

This specification describes how a computer system can implement a fully-learned object heading estimator to generate improved object heading estimations. The system can include two stages: a first stage to generate preliminary heading estimations using different forms of available sensor data and different estimation techniques, and a second stage to determine a universal or refined heading estimation based on each of the preliminary heading estimations and, optionally, additional auxiliary inputs.

In general, one innovative aspect of the subject matter described in this specification can be embodied in methods that include the actions of receiving sensor data representing measurements of an object that was detected within a proximity of a vehicle; processing the sensor data with one or more preliminary heading estimation subsystems to respectively generate one or more preliminary heading estimations for the object; processing two or more inputs with a second heading estimation subsystem to generate a refined heading estimation for the object, the two or more inputs including the one or more preliminary heading estimations for the object; and providing the refined heading estimation for the object to an external processing system.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination.

A first of the preliminary heading estimation subsystems can be a neural network system configured to classify projections of point-cloud data to generate a first preliminary heading estimation for the object. The point-cloud data can represent measurements of the object based on signals obtained by at least one of a light detection and ranging sensor (LIDAR) subsystem or a radio detection and ranging (RADAR) subsystem.

The one or more preliminary heading estimation subsystems can include at least two of: a point cloud-based heading estimation subsystem configured to process point-cloud data to generate a first preliminary heading estimation for the object, a road-based heading estimation subsystem configured to process roadgraph data and an indication of a location of the object to generate a second preliminary heading estimation for the object, or a motion-based heading estimation subsystem configured to process motion data to generate a third preliminary heading estimation for the object.

The actions can further include generating a time-averaged preliminary heading estimation based on (i) a current preliminary heading estimation from a first of the preliminary heading estimation subsystems and (ii) one or more previous preliminary heading estimations from the first of the preliminary heading estimation subsystems; and processing, by the second heading estimation subsystem and along with at least one additional input, the time-averaged preliminary heading estimation to generate the refined heading estimation for the object, the refined heading estimation for the object representing an estimate of a current heading of the object.

Another innovative aspect of the subject matter described in this specification can be embodied in computer systems, including one or more data processing apparatuses, which include: a first heading estimation subsystem configured to process sensor data representing measurements of the object to generate a first heading estimation for the object; and a second heading estimation subsystem configured to process the first heading estimation for the object and at least one additional input to generate a second heading estimation for the object, the second heading estimation for the object representing a refinement of the first heading estimation.

The foregoing and other embodiments can each optionally include one or more of the following features, alone or in combination.

The first heading estimation subsystem can include a neural network-based classifier configured to process projections of point-cloud data to generate the first heading estimation for the object, the point-cloud data representing measurements of the object based on signals obtained by at least one of a light detection and ranging sensor (LIDAR) subsystem or a radio detection and ranging (RADAR) subsystem.

The neural network-based classifier can include a plurality of point-cloud subnetworks that are each configured to operate on a different respective projection of the point-cloud data, each point-cloud subnetwork including a convolutional stack having one or more convolutional layers.

The second heading estimation subsystem can include at least one of a decision tree, a neural network, or a regression model.

The system can have multiple preliminary heading estimation subsystems including the first heading estimation subsystem. Each preliminary heading estimation subsystem can be configured to independently generate a respective preliminary heading estimation for the object. The second heading estimation subsystem can be configured to process the preliminary heading estimations for the object, including the first heading estimation for the object, to generate the second heading estimation.

The multiple preliminary heading estimation subsystems can include at least two of: a point cloud-based heading estimation subsystem configured to process point-cloud data to generate a first preliminary heading estimation for the object, a road-based heading estimation subsystem configured to process roadgraph data and an indication of a location of the object to generate a second preliminary heading estimation for the object, or a motion-based heading estimation subsystem configured to process motion data to generate a third preliminary heading estimation for the object.

The object can be an automotive vehicle, a cyclist, or a pedestrian located within a proximity of an autonomous vehicle, and the sensor data that represents the measurements of the object can be based on signals captured by one or more sensor subsystems on-board the autonomous vehicle.

The actions can further include a trajectory prediction subsystem configured to predict a future trajectory of the object using the second heading estimation.

The first heading estimation subsystem can include a classifier configured to generate the first heading estimation for the object, and the first heading estimation can include a set of confidence scores, each confidence score corresponding to a different respective heading interval and representing a likelihood that the heading of the object falls within the respective heading interval.

The second heading estimation subsystem can include a temporal filter and a heading estimation model, the temporal filter configured to process respective heading estimations from the first heading estimation subsystem for a current time step and at least one previous time step to generate a time-averaged heading estimation. The heading estimation model can be configured to process the time-averaged heading estimation and the at least one additional input to generate the second heading estimation for the object.

Particular embodiments of the subject matter described in this specification can be implemented so as to realize one or more of the following advantages. An autonomous vehicle system can estimate the headings of nearby objects to improve understanding of its environment and make better driving and navigation decisions. By employing a two-stage estimation architecture, multiple preliminary heading estimations can be combined to produce a refined heading estimation that generally has higher accuracy or confidence level than any of the preliminary estimations. Different individual heading estimation techniques may be more or less effective in different contexts. For example, motion-based heading estimation tends to be better for faster-moving objects, but is less effective for stationary or very slow moving objects. Likewise, the reliability of point-cloud based heading estimations can be diminished if an object is partially occluded or the quality of the point cloud is otherwise degraded. By making a final heading estimation using all or multiple available estimation techniques, the result may be improved on average. Because autonomous vehicles rely on accurate information about their environments to make the best driving decisions, improving the accuracy of heading estimations through a multi-stage system as described herein also improves performance of the autonomous vehicle (e.g., allowing the vehicle to make use of the refined heading estimates to more accurately plan a trajectory for the vehicle, predict trajectories for objects in the vehicle's environment, and more accurately characterize the current state of the environment). In some implementations, the second-stage heading estimator can be fully learned using automated machine-learning techniques, thereby promoting more efficient and accurate development of a model for combining preliminary heading estimations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system capable of sensing information about its environment, e.g., an autonomous vehicle, can use a multi-stage estimator to make heading estimations for nearby objects using various types of measurements about the environment and objects detected therein. A heading estimation can indicate a direction in which a particular object is likely facing in a particular coordinate system, typically at the time the measurements of the object were obtained. A heading estimation can be represented as a single direction; as a distribution of directions, each with a corresponding likelihood or confidence score; as multiple components of a single direction; or in any other appropriate representation.

Figure 1:
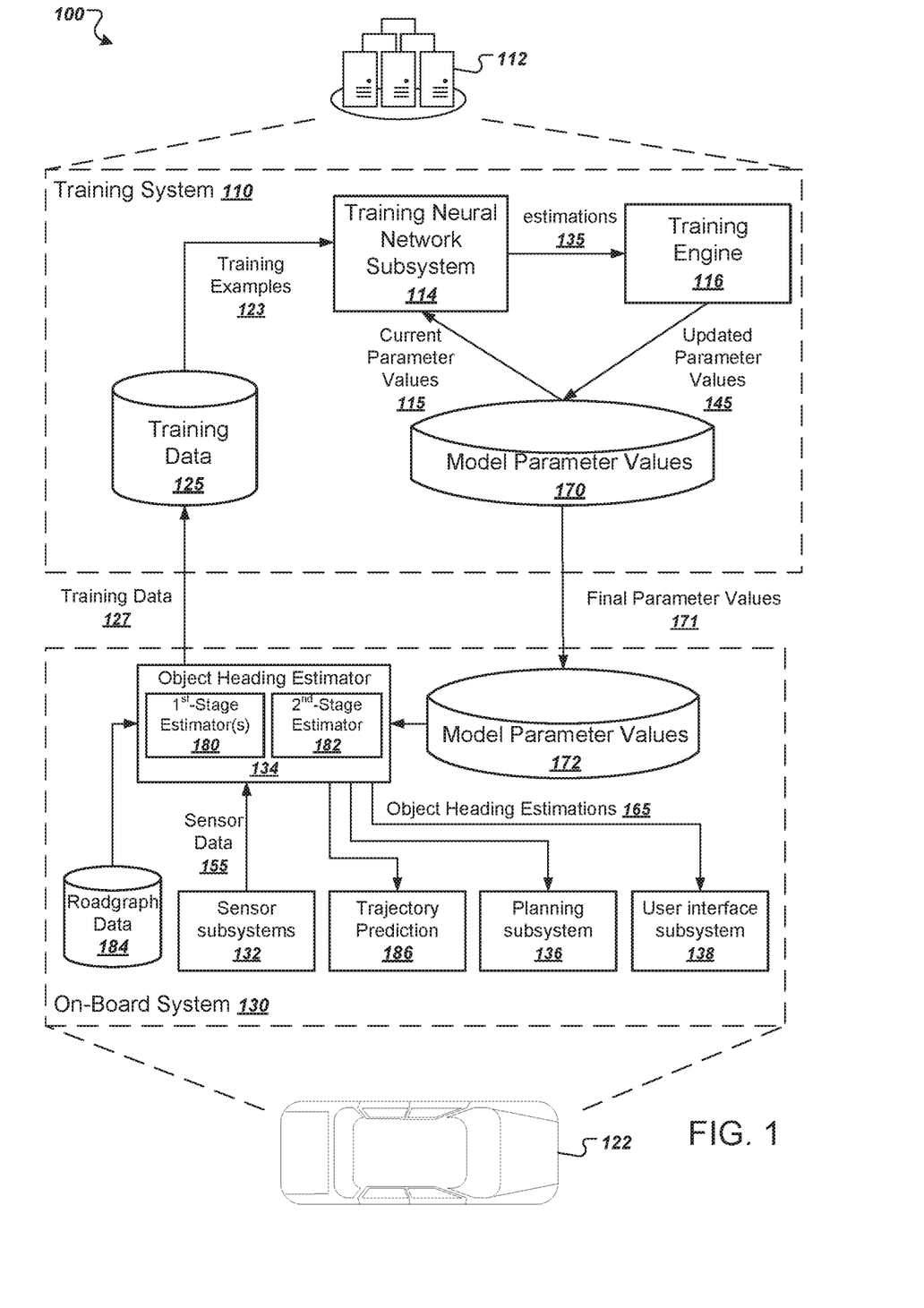
FIG. 1 is a diagram of an example system for training and using an object heading estimation system on an autonomous vehicle.

FIG. 1 is a diagram of an example system 100. The system 100 includes a training system 110 and an on-board system 130.

The on-board system 130 is physically located on-board a vehicle 122. The vehicle 122 in FIG. 1 is illustrated as an automobile, but the on-board system 130 can be located on-board any other appropriate vehicle. The vehicle 122 can be an autonomous vehicle that uses object heading estimations to inform autonomous driving decisions, such as to predict future movements and trajectories of objects (e.g., other vehicles, cyclists, pedestrians) near or around the vehicle 122.

The on-board system 130 includes one or more sensor subsystems 132. The sensor subsystems include a combination of components that receive reflections of electromagnetic radiation, e.g., light detection and ranging (LIDAR) systems that detect reflections of laser light, radio detection and ranging (RADAR) systems that detect reflections of radio waves, and camera systems that detect reflections of visible light.

The raw input sensor data can indicate a distance, a direction, and an intensity of reflected radiation. Each sensor can transmit one or more pulses of electromagnetic radiation in a particular direction and can measure the intensity of any reflections as well as the time that the reflection was received. A distance can be computed by determining a time delay between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 can also classify groups of one or more raw sensor measurements as corresponding to another object (e.g., another vehicle in proximity of vehicle 22). Each group of raw sensor measurements can be represented as a three-dimensional point cloud, with each point having an intensity and a position. In some implementations, the position is represented as a range and elevation pair. The sensor subsystems 132 can also process the raw sensor measurements to determine other attributes of objects detected in the environment of vehicle 22, such as a location of a particular object, a current trajectory of the object, recent locations or movements of the object, or combinations of these. The sensor subsystems 132 can also capture images of the environment using one or more cameras.

The sensor-subsystems 132 provide one or more types of sensor data 155 to an on-board object heading estimator 134. The sensor data 155, for example, can include point-cloud data, camera data, object location data, objection motion data, or a combination of these or other types of sensor data derived from raw sensor inputs. The on-board object heading estimator 134 processes the sensor data 155 to generate one or more object heading estimations 165. The object heading estimator 134 can include a first stage 180 having one or more preliminary heading estimators and a second stage 182 that processes multiple inputs, including the preliminary heading estimations, to determine a refined heading estimation. Additional detail about a two-stage object heading estimation system, such as the on-board object heading estimator 134 is described with respect to FIG. 3.

In some implementations, the on-board object heading estimator 134 includes a neural network system that implements the operations of each layer of a neural network trained to make the object heading estimations 165. Neural networks are machine-learning models that employ multiple layers of operations to compute one or more outputs from one or more inputs. Neural networks typically include one or more hidden layers situated between an input layer and an output layer. The output of each layer is used as input to another layer in the network, e.g., the next hidden layer or the output layer. Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons. The on-board object heading estimator 134 can include one or more computing devices having software and/or hardware modules that implement the respective operations of each layer of the neural network according to an architecture of the neural network.

For example, the on-board object heading estimator 134 can implement the operations of each layer of the neural network by loading a collection of model parameter values 172 that are received from the training system 110.

The on-board object heading estimator 134 uses the sensor data 155 to generate one or more object heading estimations 165. Each object heading estimation 165 specifies one or more directions in which a nearby vehicle is likely to be facing. The on-board object heading estimator 134 can provide the one or more object heading estimations 165 to a planning subsystem 136, a user interface subsystem 138, and/or a trajectory prediction subsystem 186.

When the planning subsystem 136 receives the one or more object heading estimations 165, the planning subsystem 136 can use the one or more object heading estimations 165 to make fully-autonomous or semi-autonomous driving decisions, thereby controlling the vehicle 122 based at least in part on the one or more object heading estimations 165. For example, the planning subsystem 136 can generate a fully-autonomous plan based on object heading estimations 165 to avoid a vehicle that is backing out of a parking space, and the vehicle 122 can autonomously maneuver according to the plan. As another example, the planning subsystem 136 can generate a semi-autonomous recommendation for a human driver to apply the brakes when a vehicle is backing out of a parking space.

The user interface subsystem 138 can receive the object heading estimations 165 and can generate a user interface presentation that indicates the locations of nearby vehicles and their associated headings. For example, the user interface subsystem 138 can generate a user interface presentation having image or video data containing a representation of the regions of space that are likely to be occupied by vehicles and can orient the vehicles in that space using their predicted headings. An on-board display device can then display the user interface presentation for view by passengers of the vehicle 122.

The trajectory prediction subsystem 136 can use the object heading estimations 165 as a feature to predict future movements of the objects that are referenced by the heading estimates 165, to plan future movements of the vehicle 122, or both. The current heading of an object can be a strong indicator of its future movements, and the trajectory prediction 186 processes the heading estimates 165 to leverage this correlation in predicting or planning future movements.

The on-board object heading estimator 134 can also use the sensor data 155 to generate training data 127. The on-board system 130 can provide the training data 127 to the training system 110 in offline batches or in an online fashion, e.g., continually whenever it is generated.

To generate the training data 127, the on-board system 130 can generate training examples having various types of sensor data, such point-cloud data, object location data, camera data, and object motion data. The training data 127 generated by the on-board system 130 can then be labeled with a heading by human labelers. Alternatively, the on-board system 130 can automatically generate a heading for the training data 127 from objects whose heading can be determined by the on-board system 130. For example, the on-board system 130 may be able to determine a reliable heading for vehicles that are moving above a threshold speed in a particular direction.

The advantage to having training data 127 generated automatically by the on-board system 130 is that the resulting neural network can learn to predict headings from the physical features of many different types of objects. For example, many fully autonomous or semi-autonomous vehicles can be deployed to generate training data for all vehicles encountered during a particular time period.

The training system 110 is typically hosted within a data center 112, which can be a distributed computing system having hundreds or thousands of computers in one or more locations. Additional details about operations for training a two-stage object heading estimator are described further with respect to FIG. 5.

The training system 110 includes a training neural network subsystem 114 that can implement the operations of each layer of a neural network that is designed to make object heading estimations from sensor data. The training neural network subsystem 114 includes a plurality of computing devices having software or hardware modules that implement the respective operations of each layer of the neural network according to an architecture of the neural network.

The training neural network generally has the same architecture and parameters as the on-board object heading estimator 134. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can generate, for each training example 123, one or more object heading estimations 135. A training engine 116 analyzes the object heading estimations 135 and compares the object heading estimations to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145. In some implementations, the first stage object estimators 180 are trained separately from the second-stage object heading estimator 182.

After training is complete, the training system 110 can provide a final set of parameter values 171 to the on-board system 130 for use in making object heading estimations 165 for fully autonomous or semi-autonomous driving decisions. The training system 110 can provide the final set of model parameter values 171 by a wired or wireless connection to the on-board system 130, for example.

Figure 2:
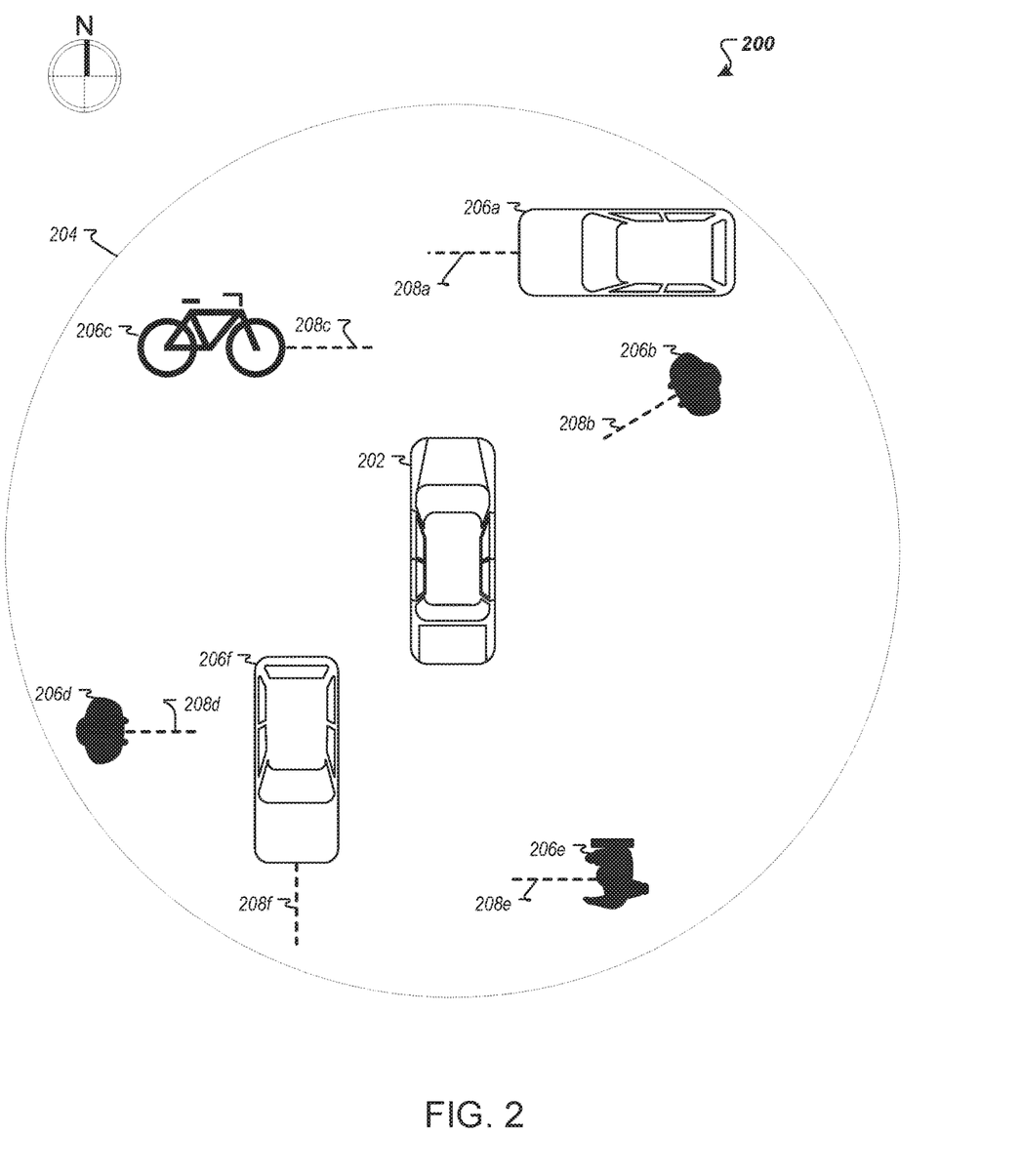
FIG. 2 is a diagram of an example environment of an autonomous vehicle.

FIG. 2 is a diagram of an example environment 200 of an autonomous vehicle 202. Sensors on the autonomous vehicle may constantly scan the environment 200, collecting measurements that can be used to inform driving decisions of the vehicle 202, including information about objects or obstacles in the environment 200 that the vehicle 202 should navigate around. For illustration, a boundary 204 is shown circumscribing a portion of the environment 200, with the autonomous vehicle 202 at its center. The boundary 204 represents a region of interest for the vehicle 202. In some implementations, the extent of the region of interest is limited by the range of the sensors on the vehicle 202. Objects within the region of interest (e.g., the region encompassed by boundary 204) may be said to be nearby or proximal to the vehicle 202.

For example, several objects 206a-f are shown at various locations around the vehicle 202. The objects include sedans 206a and 206f, a bicycle 206c, and pedestrians 206b, 206d, and 206e. At a given moment in time, each of the objects 206a-f has a corresponding heading 208a-f that represents a direction that the object is facing toward (e.g., an orientation of the object). An object can be said to be facing in a direction that is a typical or most common direction of travel for the object. For example, an automotive vehicle typically or most commonly travels forward, and so the heading of an automotive vehicle can be the direction that a front of the vehicle is facing. When the vehicle is moving forward, the heading and direction of motion of the vehicle can be the same. When the vehicle is moving in reverse, the heading and direction of motion of the vehicle can be opposite of each other. When the vehicle is stationary, the heading of the vehicle can be based on the direction that the front of the vehicle is facing. For objects that do not have a typical or most common direction of travel, the system may designate a particular side or surface of the object as a reference side or surface for the purpose of assigning a heading to the object. For instance, if the object is currently in motion, the reference side or surface of the object can be the leading side or surface of the object in the current direction of travel of the object. If the object is stationary, the reference side or surface of the object can be designated based on other criteria such as a recognizable "front" side or surface of the object or a side or surface of the object that is facing toward the vehicle 202. The heading of an object can be expressed as a direction in a defined coordinate system. The coordinate system can be aligned with cardinal geographic directions (e.g., North, South, East, West) or aligned with a current or recent heading of the vehicle 202, for example. The object estimation systems described herein can enable the autonomous vehicle 202 to estimate the headings of objects in the region of interest surrounding the vehicle 202, e.g., objects 206a-e.

Figure 3:
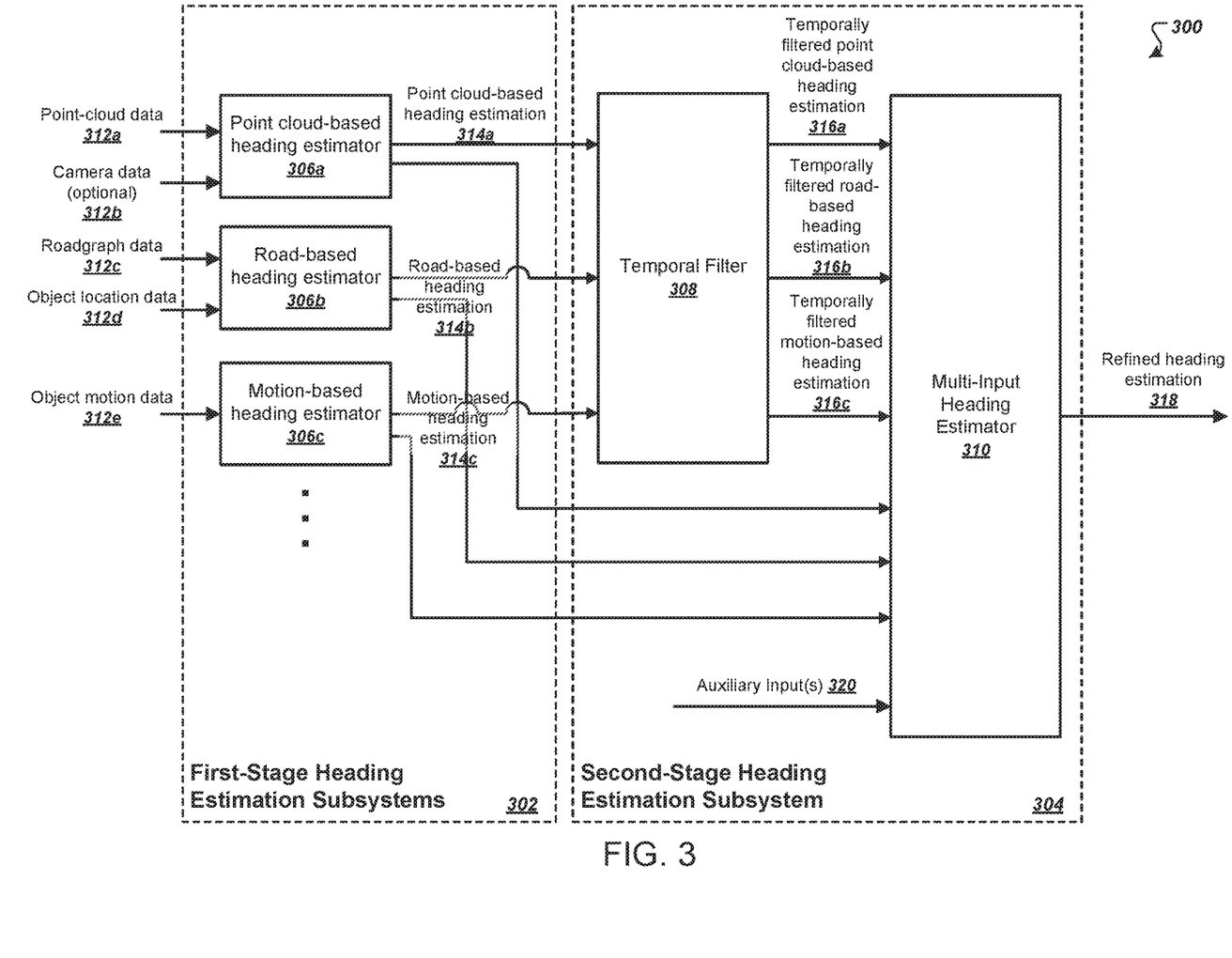
FIG. 3 is a diagram of an example two-stage object heading estimation system.

FIG. 3 is a diagram of an example object heading estimation system 300. The object heading estimation system 300 can be implemented on-board an autonomous vehicle, and corresponds, e.g., to the object heading estimator 134 depicted in FIG. 1. The object heading estimation system 300 can include one or more computers, or other data processing apparatus, programmed to generate heading estimations for an object. In some implementations, the object heading estimator 134 generates heading estimations for an object within a proximity of the autonomous vehicle on which the system 300 is located. The system 300 may be trained to estimate headings for a single type of object (e.g., other automotive vehicles, cyclists, or pedestrians), or may be trained to estimate headings for several different types of objects (e.g., other automotive vehicles, cyclists, pedestrians). In some implementations, where the system 300 is trained to estimate headings for just a single type of object, the autonomous vehicle may implement multiple instances of system 300, where each instance of the system 300 is specifically trained and configured to estimate headings for a different corresponding type of object. In some implementations, the coordinate system or point of reference for the heading estimations may be different depending on which type of object the system is evaluating. For example, for pedestrians/cyclists the system can characterize their headings in terms of a bearing angle directed towards the object from the car, while the system can characterize headings for other automotive vehicles with respect to a separate coordinate system.

The system 300 is generally operable to generate heading estimations for objects in two stages. One or more preliminary heading estimations (e.g., estimations 314a-c) for an object are generated in a first stage 302, and these preliminary heading estimations are then processed in a second stage 304 to generate a refined heading estimation 318. The second stage 304 can combine multiple inputs, including, in some implementations, multiple preliminary heading estimations to determine a refined heading estimation 318. In this way, the system 300 can leverage different sources and methodologies of heading estimations to ultimately generate an estimation that, on average, is more accurate and reliable than any of the individual sources or methodologies.

In the example shown in FIG. 3, the first stage 302 of system 300 includes three preliminary heading estimators 306a-c, although more or fewer (e.g., 1 or 2) preliminary estimators may be implemented in some examples. The preliminary heading estimators 306a-c are generally independent of each other, and can use different methodologies or techniques to estimate the heading of an object.

The point cloud-based heading estimator 306a is configured to generate a preliminary heading estimation, e.g., point cloud-based heading estimation 314a, based on point-cloud data 312a. The point-cloud data 312a includes sensor measurements, represented by points in a point-cloud, which have each been classified as belonging to a particular object within a proximity of the host vehicle, e.g., vehicle 122. Each measurement in the point-cloud data 312a can indicate a three-dimensional (3D) position in a space surrounding the host vehicle and, optionally, an intensity of a reflection at that position in pace. The point-cloud data 312a can be generated based on signals captured by one or more sensor subsystems on the host vehicle, such as a light detection and ranging (LIDAR) subsystem, a radio detection and ranging (RADAR) subsystem, or both. The points in the point cloud can represent a computed location of a surface where a detected reflection of electromagnetic radiation emitted by a corresponding sensor subsystem (e.g., LIDAR or RADAR) occurred. The point-cloud data 312a can include a 3D representation of the point cloud, one or more 2D projections of the point cloud, or both. A projection is a mapping of the point cloud onto a particular projection plane. Different projection planes can be employed to provide different views of the target object. For example, the system can generate projections representing a back-left view, a back-right view, and a top-down view, to name just a few possibilities, and the projections can be processed by the point cloud-based heading estimator 306a to generate heading estimation 314a.

Optionally, the point cloud-based heading estimator 306a can further process camera data 312b in addition to point-cloud data 312a to generate heading estimation 314a. The camera data 312b represents one or more images of the object captured by a camera subsystem on the host vehicle. The images can provide the same views of the object as those provided by corresponding point-cloud projections, or the images can represent additional or different views. The heading estimation 314a can indicate an estimated heading of the object at a current time corresponding to the time when the measurements reflected by the point-cloud data 312a and image data 312b were made.

In some implementations, the point cloud-based heading estimator 306a is a neural network system configured to perform classification tasks that involve determining likelihoods, based on point-cloud data 312a and, optionally, camera data 312b, that the current heading of the target object is within each of a pre-defined set of heading classes. Each heading class can represent an interval of heading values. For example, considering a 360-degree view of the environments surrounding the host vehicle and N pre-defined heading classes, the point cloud-based heading estimator 306a may determine confidence scores indicating likelihoods that the heading of the target object falls within each of N different heading intervals (e.g., having a span of 360/N degrees). The number of heading classes and the span of each heading interval can be suitably selected for a given application. In some implementations, the point-cloud based heading estimator 306a includes a convolutional neural network having different respective convolutional stacks for processing each of multiple point-cloud projections. The architecture of such a convolutional neural network for heading estimation is described more fully in U.S. patent application Ser. No. 15/374,884, which is fully incorporated herein by reference in its entirety.

The road-based heading estimator 306b generates a preliminary heading estimation, e.g., road-based heading estimation 314b, using roadgraph data 312c and object location data 312d. Rather than directly evaluating LIDAR or RADAR measurements of the target object like the point-cloud based heading estimator 306a, the road-based heading estimator 306b estimates a current heading of the object based on a contour of the road (or sidewalk or other pathway that the object moves along) at or near the current location of the object. The roadgraph data 312c describes a map of roads in the environment surrounding the host vehicle, and the object location data 312d indicates the current location of the object. The road-based heading estimator 306b can correlate the current location of the object with a particular location in the map described by roadgraph data 312c, and determines a heading of the object based on the contour of the road or other pathway at the spot where the object is currently located. For example, a vehicle traveling in a lane on a highway oriented due North may be estimated to be headed in the same direction as the highway, i.e., due North. A vehicle making a left turn through an intersection may have an estimated heading 314b that corresponds to the contour of a lane through the intersection that follows the left turn.

The motion-based heading estimator 306c generates a preliminary heading estimation, e.g., motion-based heading estimation 314c, using object motion data 312e. The object motion data 312e indicates motions of an object based on, for example, recently tracked locations of the object, current or recent velocities of the object, consistency of recent motions of the object, or a combination of these. Based on the object motion data 312e, the motion-based heading estimator 306c estimates the heading of an object. For example, the estimator 306c may estimate the object's heading as its direction of travel.

Each of heading estimators 306a-c in the first stage 302 is generally independent of the others, and each can have similar or different model types or operating characteristics from the others. For example, all or different ones of the heading estimators 306a-c may be implemented as multi-bin classifiers or regression models, as neural networks or heuristic-based models. Moreover, the heading estimations 314a-c generated by respective ones of the first-stage heading estimators 306a-c may have the same or different forms. A given heading estimation can be represented as a single direction (e.g., representing the most likely heading), as a distribution of directions (e.g., confidence scores for a set of heading intervals), or in any other appropriate representation.

The second heading estimation subsystem 304 uses the preliminary heading estimations 314a-c from the first stage 302, and optionally one or more auxiliary inputs 320, to determine a refined heading estimation 318. As shown in FIG. 3, the second stage subsystem 304 can include a temporal filter 308 and a multi-input heading estimation model 310.

The temporal filter 308 is configured to generate temporally filtered heading estimations, e.g., heading estimations 316a-c, based on recent preliminary heading estimations, e.g., heading estimations 314a-c. For example, the system 300 may be operable to generate updated heading estimations for an object on a regular basis, by periodically (e.g., every 100-500 milliseconds) processing new measurements of the object and determining updated heading estimations based on the new measurements (e.g., based on updated point-cloud data 312a for a latest LIDAR or RADAR sweep, updated object motion data 312e representing the latest detected motion of the object, and/or based on updated object location data 312d representing the latest detected location of the object). Each instance that updated measurements become available and the preliminary heading estimators 306a-c process the updated measurements to generate new preliminary heading estimations 314a-c is referred to as a time step. At each time step, the temporal filter 308 processes the latest (i.e., current) preliminary heading estimations 314a-c, along with preliminary heading estimations 314a-c from one or more previous time steps, to generate temporally filtered heading estimations 316a-c for the current time step. The number of preceding time steps referenced by the temporal filter 308 may be static (e.g., 1, 2, 5, 10, or more), or may vary based on real-time operating conditions of the system. Various rules or operations may be applied to generate a temporally filtered heading estimation. In one example, the temporal filter 308 averages the preliminary heading estimations from a particular source over the most recent n time steps to generate a time-averaged heading estimation. In another example, the temporal filter 308 low-pass filters the preliminary heading estimations from a particular source over the most recent n time steps. The temporal filter 308 can temporally filter the heading estimations 314a-c provisioned by each estimator 306a-c in the first stage 302, or the temporal filter 308 may temporally filter preliminary heading estimations from only particular ones of the estimators 306a-c, but not others. The same or different filtering rules/operations can apply for each channel of preliminary heading estimations (i.e., for the preliminary heading estimations 314a-c from each of the different heading estimators 306a-c).

In some implementations, the temporal filter 308 may additionally or alternatively generate temporally filtered heading estimations based on the refined heading estimations from multi-input heading estimator 310 from one or more previous time steps. That is, the reined heading estimation 318 at each time step may be fed as an input to the temporal filter 308 at the next time step, and the temporal filter 308 can process a pre-defined number of the most recent refined heading estimations to provide a temporally filtered refined heading estimation as input to the heading estimator 310.

The multi-input heading estimator 310 processes multiple channels of heading estimations, and optionally one or more auxiliary inputs 320, to generate a refined heading estimation 318. The refined heading estimation 318 can tend to be more accurate than the heading estimations 314a-c generated by any single one of the preliminary heading estimators 306a-c due, to the benefits of accounting for estimations from other sources and accounting for estimations over time via temporally filtered estimations.

Different types of models may be employed to implement the multi-input heading estimator 310. In some implementations, the multi-input heading estimator 310 is a decision tree that determines a refined heading estimation 318 by traversing a logical decisional matrix based on the inputs to a particular leaf of the tree. In some implementations, the multi-input heading estimator 310 is a neural network system (e.g., a feedforward or convolutional neural network), and further the neural network system can be a classifier. The classifier can have the same number of classes representing the same heading intervals as any of the preliminary heading estimators 306a-c, or may have an even greater number of classes, so that the sizes of the heading intervals are smaller and the refined heading estimation 318 thereby provides greater resolution than the preliminary heading estimations 314a-c. In some implementations, the multi-input heading estimator 310 includes a regression model configured to determine a precise heading estimation for the object, rather than a heading interval corresponding to a class in a classifier-type model. For example, the regression model may be a neural network that includes a linear output layer that generates a value between zero and two*pi (when angles are represented as radians) or between zero and three hundred sixty (when angles are represented as degrees).

The multi-input heading estimator 310 can process combinations of preliminary heading estimations 314a-c, temporally filtered heading estimations 316a-c, and auxiliary inputs 320 to generate refined heading estimation 318. Although FIG. 3 shows all of the preliminary heading estimations 314a-c and temporally filtered heading estimations 316a-c as inputs to the heading estimator 310, in some implementations, only a subset of these heading estimations 314a-c, 316a-c are processed by the estimator 310 to generate the refined heading estimation 318. For example, only the non-temporally filtered estimations 314a-c may be provided as inputs to the estimator 310, or only the temporally filtered estimations 316a-c may be provided as inputs to the estimator 310.

In some implementations, the preliminary heading estimators 306a-c provide their corresponding heading estimations 314a-c to the temporal filter 308 in a different form than they are provided directly to the multi-input heading estimator 310. For instance, the point cloud-based heading estimator 306a may provide a distribution of preliminary heading estimates (e.g., confidence scores indicating likelihoods of the heading of the object being within each of a set of heading intervals) directly to the multi-input heading estimator 310, so that the estimator 310 can process the entire distribution when determining the refined heading estimation 318. However, only a single heading estimate representing the most likely heading of the object may be provided to the temporal filter 308. The temporal filter 308 can generate temporally filtered heading estimation 316a, e.g., by time-averaging the most likely heading estimates 314a over a specified number of recent time steps, without considering the distribution of confidences across the set of heading intervals. Similar differences in form may apply to the heading estimations 314b-c generated by preliminary heading estimators 306b-c, respectively.

The multi-input heading estimator 310 can optionally process one or more auxiliary inputs 320, along with the preliminary heading estimations, in generating refined heading estimation 318. The auxiliary inputs 320 are additional inputs that bear relevance to the heading of an object, but that are not heading estimations themselves. For example, if the system 300 is configured to estimate headings for multiple types of objects (e.g., automotive vehicles, cyclists, pedestrians), the auxiliary inputs 320 can include an object-type indicator that indicates a true or estimated indication of the type of object for which a heading is to be estimated. The object-type indicator can also or alternatively be processed as an input by any of the preliminary heading estimators 306a-c in the first stage 302. Other information that may be included among the auxiliary inputs 320 include object location data, object motion data, roadgraph data, camera data, point-cloud data, or a combination of these or other data.

Figure 4:
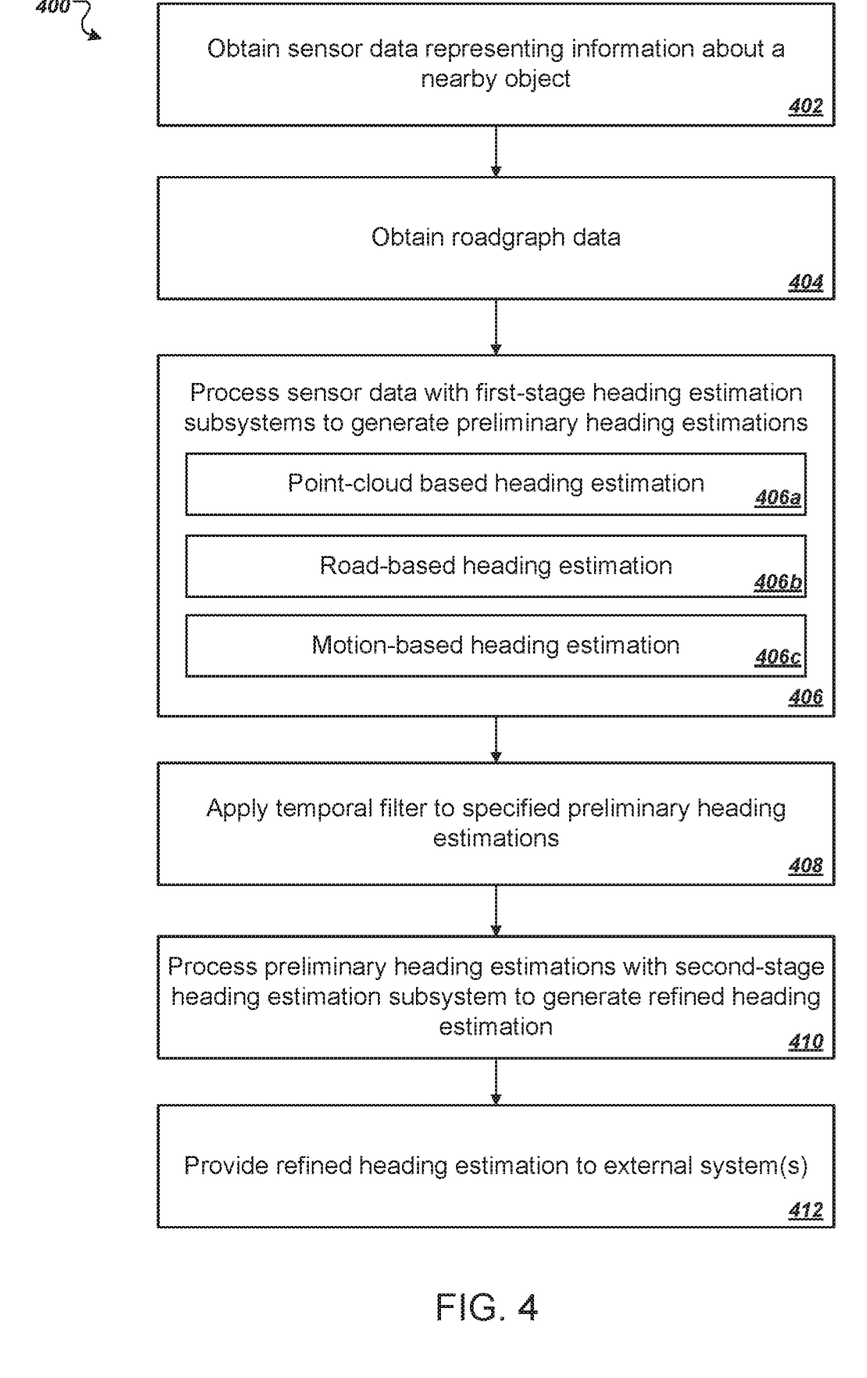
FIG. 4 is a flowchart of an example process for estimating the heading of an object within the vicinity of an autonomous vehicle.

FIG. 4 is a flowchart of an example process 400 for estimating a heading of an object. In some implementations, the example process 400 is performed by systems on-board an autonomous vehicle, e.g., system 130 (FIG. 1) or system 300 (FIG. 3), for the purpose of determining headings of objects located nearby the vehicle. Information about the headings of the objects can then be applied, for example, to plan movements (e.g., a trajectory) of the autonomous vehicle, to determine orientations of bounding boxes for the detected objects, to present a map of the environment including representations of the detected objects oriented consistent with their estimated headings, or for any other suitable end.

At stage 402, the system obtains sensor data representing information about a particular object detected within a proximity of the autonomous vehicle. The sensor data indicates measurements about the object based on signals generated by one or more sensor subsystems on the vehicle, e.g., LIDAR, RADAR, and/or camera systems. Sensor data can include point cloud data that describes locations, and optionally intensities, for points of reflections of electromagnetic radiation from LIDAR or RADAR systems; camera data that includes or characterizes images of the object; object location data that describes current and/or past locations of the object; object motion data that describes recent movements of the object; or a combination of these or other measurements.

At stage 404, the system can optionally obtain roadgraph data. The roadgraph data describes a map of the environment surrounding the autonomous vehicle. Roadgraph data can include information such as locations and contours of roads or other pathways for vehicles in the environment, and outlines and/or midlines of travel lanes for the roads or pathways. For example, roadgraph data can describe the lanes of roads in a particular geographic location and their associated direction of travel At stage 406, the system processes the sensor data, and optionally roadgraph data, with first-stage (preliminary) heading estimation subsystems, e.g., estimators 306a-c, to generate one or more preliminary heading estimations, e.g., estimations 314a-c. The preliminary heading estimations can be estimated using different forms of sensor data and different methodologies. For example, a point-cloud based heading estimation can be determined by processing different projections of a point cloud for the object using a convolutional neural network-based classifier (406a). A road-based heading estimation subsystem can process roadgraph and object location data to estimate the heading of an object based on the direction or contour of the road where the object (e.g., a car or similar vehicle, cyclist, or pedestrian) is currently located (406b). The location of a vehicle within a particular lane can be determined, and then the heading determined from the direction of travel associated with that particular lane. A motion-based heading estimation subsystem can process object motion data to estimate the heading of the object based recently detected movements of the object (406c).

At stage 408, the preliminary heading estimations, or a subset thereof, are temporally filtered. A temporal filter, e.g., temporal filter 308, includes a memory that stores information about preliminary heading estimations generated at preceding time steps. For each channel of preliminary heading estimations provided as input, the temporal filter generates a corresponding temporally filtered heading estimation based on the heading estimations at a current time step and one or more preceding time steps. Different types of temporal filters may be implemented, such as a time-averaging filter or a low-pass filter. In some implementations, the temporal filter generates a time-averaged heading estimation by taking the mean or weighted average of heading estimations over a specified number of most recent time steps.

At stage 410, a second-stage heading estimator, e.g., multi-input heading estimator 310, processes a set of inputs to determine a refined heading estimation for the object. The set of inputs can include one or more temporally filtered preliminary heading estimations, one or more non-temporally filtered preliminary heading estimations, auxiliary input(s), or a combination of these. In some implementations, the second-stage heading estimator processes different representations of a common preliminary heading estimation. For example, the second-stage heading estimator may process a distribution of heading confidence scores for different heading intervals as well as a temporally-filtered representation of the most likely heading expressed as a single value.

Upon generating the refined heading estimation, they may be made available to one or more external systems, i.e., systems other than the object heading estimation system (stage 412). The refined heading estimation may be provided to, or retrieved by, a trajectory prediction system, a planning system, or a user interface subsystem, for example.

Figure 5:
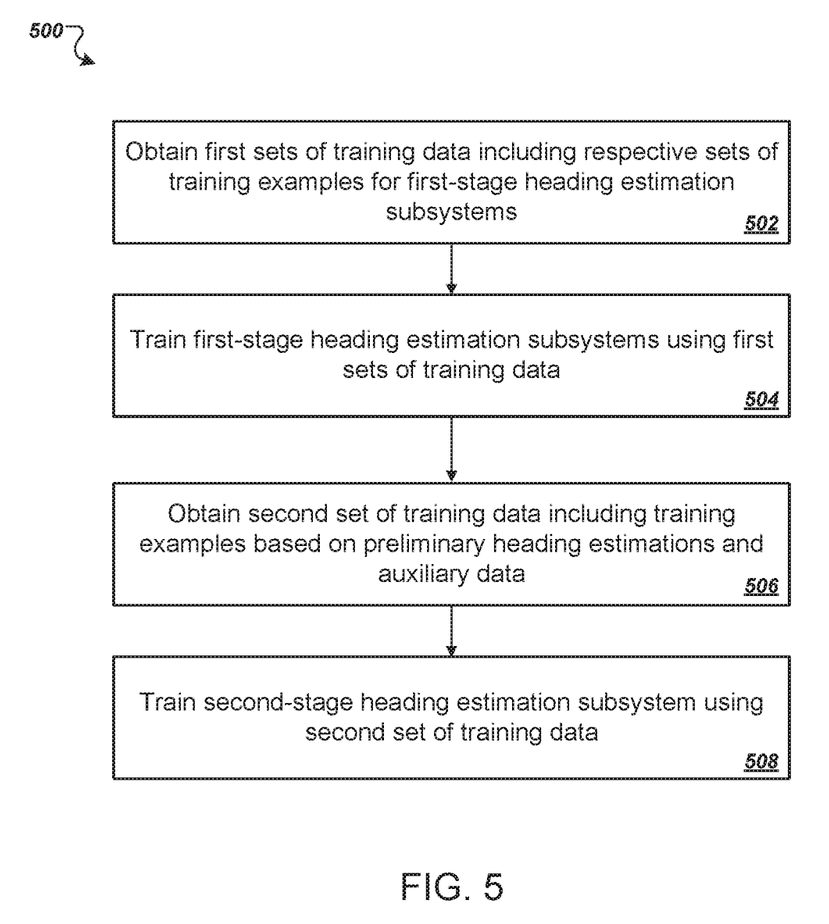
FIG. 5 is a flowchart of an example process for training a multi-stage object heading estimation system.

FIG. 5 is a flowchart of an example process 500 for training an object estimation system such as the object heading estimator 134 (FIG. 1) or the system 300 (FIG. 3). In some implementations, just as a final or refined heading estimation is generated in two stages, the object heading estimation can also be trained in two stages. In the first stage, the preliminary heading estimators are trained. If the system includes more than one preliminary heading estimator, each can be trained independent of the other. Once the preliminary heading estimators have been trained, the second-stage estimator can be trained thereafter based on training examples derived from preliminary heading estimations generated by the trained preliminary heading estimators. Different machine-learning or other techniques can be used to train different ones of the preliminary heading estimators and/or the second-stage heading estimator in a manner that is appropriate for the respective model. For example, neural network-based models may be trained using an iterative updating process that updates model parameter values process based on stochastic gradient descent with backpropagation.

In an example training process 500, the system at stage 502 obtains first training data that includes different sets of training examples for each first-stage preliminary heading estimator that is to be trained. For instance, a first set of training data may be obtained to train a point-cloud based heading estimator and a second set of training data may be obtained to train a road-based heading estimator. The first training data may be labeled, so that each training example includes both a training input and a target output (i.e., a label). The training input can include sensor data and/or roadgraph data depending on the type of estimator being trained, and the target output is a machine-estimated or human-labeled indication of the heading of the object represented by the training input. At stage 504, the system trains the first-stage heading estimators, e.g., by adjusting model parameter values to minimize a difference between the target output of training examples and the actual output of the corresponding model.

At stage 506, the system obtains second training data that includes training examples for training the second-stage heading estimator. The second training examples also include training inputs and a target output (i.e., a label). The training inputs can include preliminary heading estimations from one or more preliminary heading estimators, temporally filtered preliminary heading estimators, auxiliary inputs, or a combination of these. The preliminary heading estimations can be generated from the trained preliminary heading estimators. The target output can be a machine-estimated or human-labeled indication of the heading of the object represented by the training inputs. At stage 508, the system trains the second-stage heading estimator, e.g., by adjusting model parameter values to minimize a difference between the target output of training examples and the actual output of the model.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system, including one or more data processing apparatuses, for estimating a heading of an object, comprising:
   a first heading estimation subsystem configured to process sensor data representing measurements of the object to generate a first heading estimation for the object, the first heading estimation indicating an initial estimate of an orientation of the object in an environment; and
   a second heading estimation subsystem configured to process the first heading estimation for the object and at least one additional input to generate a second heading estimation for the object that indicates a refined estimate of the orientation of the object in the environment; and
   a trajectory prediction subsystem configured to generate a predicted trajectory of the object moving through the environment using the second heading estimation, the predicted trajectory indicating a predicted direction of travel of the object moving through the environment that is distinct from the orientation of the object in the environment.

2. The system of claim 1, wherein the first heading estimation subsystem comprises a neural network-based classifier configured to process projections of point-cloud data to generate the first heading estimation for the object, the point-cloud data representing measurements of the object based on signals obtained by at least one of a light detection and ranging sensor (LIDAR) subsystem, a camera subsystem, or a radio detection and ranging (RADAR) subsystem.

3. The system of claim 2, wherein the neural network-based classifier comprises a plurality of point-cloud subnetworks that are each configured to operate on a different respective projection of the point-cloud data, each point-cloud subnetwork comprising a convolutional stack having one or more convolutional layers.

4. The system of claim 1, wherein the second heading estimation subsystem comprises at least one of a decision tree, a neural network, or a regression model.

5. The system of claim 1, wherein the system comprises a plurality of preliminary heading estimation subsystems including the first heading estimation subsystem, and each preliminary heading estimation subsystem is configured to independently generate a respective preliminary heading estimation for the object,
   wherein the second heading estimation subsystem is configured to process the preliminary heading estimations for the object, including the first heading estimation for the object, to generate the second heading estimation.

6. The system of claim 5, wherein the plurality of preliminary heading estimation subsystems includes at least two of:
   a point cloud-based heading estimation subsystem configured to process point-cloud data to generate a first preliminary heading estimation for the object;
   a road-based heading estimation subsystem configured to process roadgraph data and an indication of a location of the object to generate a second preliminary heading estimation for the object; or
   a motion-based heading estimation subsystem configured to process motion data to generate a third preliminary heading estimation for the object.

7. The system of claim 1, wherein the object is an automotive vehicle, a cyclist, or a pedestrian located within a proximity of an autonomous vehicle, and the sensor data that represents the measurements of the object is based on signals captured by one or more sensor subsystems on-board the autonomous vehicle.

8. The system of claim 1, wherein the first heading estimation subsystem comprises a classifier configured to generate the first heading estimation for the object, and the first heading estimation comprises a plurality of confidence scores, each confidence score corresponding to a different respective heading interval and representing a likelihood that the heading of the object falls within the respective heading interval.

9. The system of claim 1, wherein the second heading estimation subsystem comprises a temporal filter and a heading estimation model, the temporal filter configured to process respective heading estimations from the first heading estimation subsystem for a current time step and at least one previous time step to generate a time-averaged heading estimation, and the heading estimation model configured to process the time-averaged heading estimation and the at least one additional input to generate the second heading estimation for the object.

10. The system of claim 1, wherein the first heading estimation for the object is determined for a current time step, wherein the sensor data that the first heading estimation subsystem is configured to process to generate the first heading estimation for the object at the current time step comprises motion data that describes a motion of the object over a period of time, wherein the second heading estimation subsystem is configured to process the first heading estimation for the object at the current time step and one or more additional heading estimations for the object at one or more preceding time steps to generate the second heading estimation for the object.

11. The system of claim 1, wherein the predicted direction of travel of the object moving through the environment matches the orientation of the object in the environment.

12. The system of claim 1, wherein the predicted direction of travel of the object moving through the environment does not match the orientation of the object in the environment.

13. A computer-implemented method, comprising:
receiving sensor data that represents measurements of an object that was detected within a proximity of a vehicle;
processing the sensor data with a preliminary heading estimation subsystem to generate a preliminary heading estimation for the object, the preliminary heading estimation indicating an initial estimate of an orientation of the object in an environment;
processing two or more inputs with a second heading estimation subsystem to generate a refined heading estimation for the object, the two or more inputs including the preliminary heading estimation for the object and at least one additional input the refined heading estimation for the object indicating a refined estimate of the orientation of the object in the environment;
generating a predicted trajectory of the object moving through the environment using the refined beading estimation, the predicted trajectory indicating a predicted direction of travel of the object moving through the environment that is distinct from the orientation of the object in the environment; and
using the predicted trajectory of the object in a process for planning movements of the vehicle in the environment.

14. The computer-implemented method of claim 13, wherein the preliminary heading estimation subsystem comprises a neural network system, and the method further comprises:
receiving point-cloud data that represents measurements of the object based on signals obtained by a light detection and ranging (LIDAR) sensor subsystem; and
classifying, with the neural network system, projections of the point-cloud data to generate the preliminary heading estimation for the object.

15. The computer-implemented method of claim 13, comprising providing at least two of:
a point cloud-based heading estimation subsystem configured to process point-cloud data to generate a first preliminary heading estimation for the object;
a road-based heading estimation subsystem configured to process roadgraph data and an indication of a location of the object to generate a second preliminary heading estimation for the object; or
a motion-based heading estimation subsystem configured to process motion data to generate a third preliminary heading estimation for the object.

16. The computer-implemented method of claim 13, further comprising:
generating a time-averaged preliminary heading estimation based on (i) a current preliminary heading estimation and (ii) one or more previous preliminary heading estimations; and
processing, by the second heading estimation subsystem and along with at least one additional input, the time-averaged preliminary heading estimation to generate the refined heading estimation for the object.

17. One or more non-transitory computer-readable media having instructions encoded thereon that, when executed by one or more data processing apparatuses, cause the data processing apparatuses to perform operations comprising:
receiving sensor data that represents measurements of an object that was detected within a proximity of a vehicle;
processing the sensor data with preliminary heading estimation subsystem to generate a preliminary heading estimation for the object, the preliminary heading estimation indicating an initial estimate of an orientation of the object in an environment independent of any motion of the object;
processing two or more inputs with a second heading estimation subsystem to generate a refined heading estimation for the object, the two or more inputs including the preliminary heading estimation for the object and at least one additional input, the refined heading estimation for the object indicating a refined estimate of the orientation of the object in the environment independent of any motion of the object;
generating a predicted trajectory of the object moving through the environment using the refined beading estimation, the predicted trajectory indicating a predicted direction of travel of the object moving through the environment that is distinct from the orientation of the object in the environment; and
using the predicted trajectory of the object in a process for planning movements of the vehicle in the environment.

18. The computer-readable media of claim 17, wherein the preliminary heading estimation subsystem comprises a neural network system configured to classify projections of point-cloud data to generate the preliminary heading estimation for the object, the point-cloud data representing measurements of the object based on signals obtained by at least one of a light detection and ranging sensor (LIDAR) subsystem or a radio detection and ranging (RADAR) subsystem.

19. The computer-readable media of claim 17, wherein the operations comprise providing at least two of:
a point cloud-based heading estimation subsystem configured to process point-cloud data to generate a first preliminary heading estimation for the object;
a road-based heading estimation subsystem configured to process roadgraph data and an indication of a location of the object to generate a second preliminary heading estimation for the object; or
a motion-based heading estimation subsystem configured to process motion data to generate a third preliminary heading estimation for the object.

20. The computer-readable media of claim 17, wherein the operations further comprise:
- generating a time-averaged preliminary heading estimation based on (i) a current preliminary heading estimation and (ii) one or more previous preliminary heading estimations;
- processing, by the second heading estimation subsystem and along with at least one additional input, the time-averaged preliminary heading estimation to generate the refined heading estimation for the object.

21. The computer-readable media of claim 17, wherein the object is an automotive vehicle, a cyclist, or a pedestrian located within a proximity of an autonomous vehicle, and the sensor data that represents the measurements of the object is based on signals captured by one or more sensor subsystems on-board the autonomous vehicle.

* * * * *